United States Patent
Nyfors et al.

(10) Patent No.: US 7,770,469 B2
(45) Date of Patent: Aug. 10, 2010

(54) DIFFERENTIAL PRESSURE MEASUREMENT DEVICE HAVING A MICROWAVE RESONATOR WITH A FLEXIBLE MEMBER

(75) Inventors: Ebbe Gustaf Nyfors, Sandnes (NO); Per Hassel Sørensen, Sandnes (NO)

(73) Assignee: Roxar Flow Measurement AS, Bergen (NO)

( * ) Notice: Subject to any disclaimer, the term of this patent is extended or adjusted under 35 U.S.C. 154(b) by 0 days.

(21) Appl. No.: 12/162,101

(22) PCT Filed: Feb. 1, 2007

(86) PCT No.: PCT/NO2007/000032

§ 371 (c)(1),
(2), (4) Date: Jul. 24, 2008

(87) PCT Pub. No.: WO2007/089156

PCT Pub. Date: Aug. 9, 2007

(65) Prior Publication Data

US 2009/0000393 A1    Jan. 1, 2009

(30) Foreign Application Priority Data

Feb. 3, 2006    (NO) .................. 20060571

(51) Int. Cl.
*G01F 1/34* (2006.01)
*G01F 15/075* (2006.01)
*G01F 1/37* (2006.01)

(52) U.S. Cl. .............. 73/861.42; 73/861.44; 73/861.52

(58) Field of Classification Search ........... None
See application file for complete search history.

(56) References Cited

U.S. PATENT DOCUMENTS

| | | | |
|---|---|---|---|
| 3,161,060 A | | 12/1964 | Kemmer |
| 3,252,325 A | * | 5/1966 | Miller .................. 73/702 |
| 3,939,406 A | | 2/1976 | Billeter et al. |
| 6,173,617 B1 | | 1/2001 | Zarudiansky |
| 6,915,707 B2 | * | 7/2005 | Nyfors et al. ........... 73/861.63 |
| 7,017,418 B1 | * | 3/2006 | Thakre et al. .......... 73/716 |
| 7,293,471 B2 | * | 11/2007 | Lund Bo et al. ......... 73/861.52 |
| 7,481,118 B2 | * | 1/2009 | Nyfors .................. 73/861 |

(Continued)

FOREIGN PATENT DOCUMENTS

| FR | 2 233 604 | 1/1975 |
|---|---|---|
| WO | 03/034051 | 4/2003 |

OTHER PUBLICATIONS

"Introducing Low Differential Pressure Instruments" Product Brochure No. M-1-01, Orange Research, Milford, CT.

(Continued)

*Primary Examiner*—Harshad Patel
(74) *Attorney, Agent, or Firm*—Nixon & Vanderhye P.C.

(57) ABSTRACT

A differential pressure (dP) measurement device for use in flow measurement including a first microwave resonator (1) having a flexible or yieldable part or member (4) deformable or yieldable when subject to a differential pressure in such a way as to alter a resonant frequency of said resonator, and an electronic unit (12, 14) which is coupled to the resonator (1), and where the electronic unit is adapted to produce an output depending on a resonant frequency of the resonator (1).

26 Claims, 10 Drawing Sheets

U.S. PATENT DOCUMENTS

2004/0244501 A1* 12/2004 Nyfors et al. ............ 73/861.63
2005/0188771 A1* 9/2005 Lund Bo et al. .............. 73/861

OTHER PUBLICATIONS

International Search Report for PCT/NO2007/000032, mailed May 30, 2007.

Written Opinion of the International Searching Authority for PCT/NO2007/000032, mailed May 30, 2007.

International Preliminary Report on Patentability for PCT/NO2007/000032, dated Jun. 5, 2008.

Norway Search Report for Norway Application No. 2006 0571, dated Jul. 6, 2006.

* cited by examiner

DIFFERENTIAL PRESSURE MEASUREMENT DEVICE HAVING A MICROWAVE RESONATOR WITH A FLEXIBLE MEMBER

This application is the U.S. national phase of International Application No. PCT/NO2007/000032, filed 1 Feb. 2007, which designated the U.S. and claims priority to Norway Application No. 2006 0571, filed 3 Feb. 2006, the entire contents of each of which are hereby incorporated by reference.

The present invention relates in general to flow metering and flow metering related to measurements in industrial applications in particular, for example measurements of two-phase or three-phase gas/hydrocarbon/water fluid flows in pipelines used in the oil and gas industry.

More particularly, the present invention relates to a new device for making differential pressure measurements in a fluid flow, either in a stand-alone pressure sensor unit or for integration or combination with other types of sensors, such as e.g. sensors for permittivity, temperature, static pressure, etc.

BACKGROUND AND PRIOR ART

A common principle for the measurement of fluid flow is the measurement of differential pressure over a restriction, like an orifice, a Venturi tube, or a so-called V-cone [1]. A differential pressure measurement can be a stand alone measurement for obtaining a measure of the flow, or it can be used in combination with other measurements, for example as in a WGM (Wet Gas Meter) described by this applicant in ref. [2], a reference which is hereby incorporated in full by way of reference, where differential pressure measurement is combined with a microwave resonator based measurement of the permittivity of the fluid, and where so-called PVT calculations are performed in order to arrive at a result indicating properties of the fluid and its composition.

Ref. [2] describes a number of embodiments of an integrated mechanical structure for creating a differential pressure (dP) in a pipeline. The differential pressure generating structure forms an integrated part of a microwave resonator.

Traditionally, a pair of pressure sensing taps is arranged at different locations in relation to a differential pressure generating structure in a conduit or pipeline for a fluid flow. The taps are normally connected to respective pipes which transfers the pressures at each respective pressure tap to respective inputs of a commercial differential pressure (dP) transmitter. In the dP-transmitter a sensor element, usually some form of membrane, is deformed by the differential pressure.

In one known differential pressure transmitter [3] the difference in pressure between two chambers of a differential pressure transmitter is detected by arranging a diaphragm between the two chambers and detecting the deflection of the diaphragm by one or more contact-free inductive pickups. Electrical signals from the pickups are used as indicators of pressure changes.

In other prior art solutions for pressure measurement a flexible membrane is arranged as part of a capacitor [4]. The capacitance thereby changes with the deformation of the membrane. An electronic capacitance measuring circuit may then be connected to the parallel-plate capacitor for converting the capacitance of the capacitor into an electric signal representing the value of the capacitance of the capacitor and of the associated parts.

Another means of measuring the deflection, and thus the differential pressure is to use strain gauges attached to the membrane. By measuring the change of resistance in the strain gauges, the differential pressure over the membrane can be found.

The prior art has some limitations. Measurements of typical inductance, capacitance and resistance values are prone to drift, e.g. with temperature of the electronics, unless properly compensated. Contributions to the measured capacitance from lengthy wires and other parts of the measurement circuitry may interfere with the desired measurement. In the design of a traditional differential pressure measurement system a design compromise typically therefore normally to be made between a low interference solution and a short distance between sensor transducers and electronics units.

In subsea applications prior art dP-measurement techniques have a couple of other additional limitations to overcome. First, prior art dP-units qualified for subsea use are relatively expensive and relatively bulky, and they add to the total amount of electronics in a flow metering installation. A reduced MTTF (Mean Time to Failure) typically results. The dP-units typically also require transmitter electronics for communication with other units receiving the measurement results, e.g. a computing unit in a Wet Gas Meter (WGM). In subsea applications, where the meter is difficult to access for service, it is desirable to have an MTTF-value that is as high as possible. To achieve a high MTTF-value it is generally desirable to reduce the number of electronic units.

Secondly, when used in the oil and gas industry for transporting fluid mixtures of liquid and gaseous hydrocarbons and possibly water, a dP-transmitter is normally connected to pressure taps via a pipe or duct section of some length. Such pipe or duct sections are prone to clogging, e.g. by hydrate formation due to a higher temperature inside the transporting conduit than in the pipes leading to the dP-transmitter. This is especially true in subsea applications where the ambient seawater cools the pressure tapping ducts to a lower temperature than the flow.

Hence, it is an objective of the present invention to provide a new apparatus for differential pressure measurement which is less affected by the above limitations, and whose electronic part is simplified as compared to the present solution.

SUMMARY OF THE INVENTION

The objectives above have been met by providing a differential pressure (dP) measurement device for use in flow measurement comprising a first microwave resonator having a flexible or yieldable part or member, for example a membrane which is deformable or yieldable when subject to a differential pressure in such a way as to alter a resonant frequency of a microwave resonator. An electronic unit is coupled to the microwave resonator for applying a microwave signal to the microwave resonator and an electronic unit is adapted to produce an output depending on a resonant frequency of the microwave resonator.

In one embodiment of the dP-measurement device according to the invention the microwave resonator has a flexible part or a yieldable member integrated in any type of dP-generating structure, for example a V-cone arranged inside a pipeline. This makes a compact device structure. The microwave resonator can in one embodiment be connected to dP-microwave probes placed on the dP-generating structure so as to be able to capacitively couple to a corresponding microwave excitation probe which is placed on said pipeline adjacent to said degenerating structure. In a further embodiment the microwave excitation probe is arranged at a location where it may also excite the microwave resonator constituted by the pipeline wall, the dP-generating structure and the volume between these.

In yet an embodiment of the dP-measurement device according to the invention the microwave resonator has a flexible part or a yieldable member which is integrated in a Venturi-section of a pipeline. This way the device becomes an integrated part of a section of pipeline.

In an embodiment of the dP-measurement device according to the invention the microwave resonator has a flexible part/a yieldable member which is integrated in a wall of a pipeline for conveying a fluid.

In an embodiment of the dP-measurement device according to the invention it includes a single microwave probe and a circulator whereby the microwave probe can be operated to excite a microwave signal in said microwave resonator as well as to couple a microwave signal reflected from the resonator to a microwave signal detection unit. This way the control & signal processing unit can be adapted, for example by using a suitable software hardware program, to calculate a reflection coefficient of said resonator, said reflection coefficient representing the state of said resonator.

Yet an embodiment of the dP-measurement device according to the invention comprises two microwave probes coupled to said resonator at separate positions on said resonator. The first probe is coupled to a microwave signal generator for exciting a microwave signal into said resonator. The second microwave probe is used to couple a microwave signal transmitted in said resonator to a microwave signal detection unit. The control & signal processing unit is adapted to calculate a transmission coefficient of the resonator where the transmission coefficient representing the state of the microwave resonator.

In a further embodiment of the dP-measurement device according to the invention an electronic oscillator circuit is coupled with the microwave resonator in such a way that the oscillator locks to the resonant frequency of the resonator. This way a measurement of the resonant frequency of the electronic as a result of application of a differential pressure oscillator circuit provides a measure of the state/condition of the microwave resonator.

In yet an embodiment of the dP-measurement device according to the invention a differential pressure generating structure is used for creating a differential pressure in a fluid flow in a pipeline conveying the fluid.

In one embodiment of the dP-measurement device according to the invention the flexible part/yieldable member is arranged so as to divide an internal volume defining said microwave resonator into a first and second chamber, where the first and second chambers each have separate openings towards a fluid flow of a pipeline conveying the fluid. In a version of this embodiment, the first and second chambers are coupled to operate as a pair of microwave resonator sensors separated by a membrane. This way a deformation of the membrane causes shifts in the resonant frequency for the two resonators in opposite directions. In yet a version of this embodiment the separate openings are arranged so as to give a pressure difference, i.e. a differential pressure, between said first and second chambers when a fluid flows in the pipeline.

In one embodiment of the dP-measurement device according to the invention a microwave power dividing part is arranged to split a microwave signal from a microwave generator to a wet gas meter (WGM) unit and to a differential pressure unit (dP), and a microwave power combiner is arranged for combining microwave power having been transmitted via said WGM-unit and via said dP-unit.

In a still further embodiment of the dP-measurement device according to the invention microwave power switching parts are arranged to switch a microwave signal from a microwave generator between a wet gas meter (WGM) unit and a differential pressure unit (dP), and to switch the microwave signal having been transmitted via said WGM-unit or via said dP-unit to the microwave detection unit.

Yet further, an embodiment of the dP-measurement device according to the invention comprises a tunable microwave signal generator. The frequency of the generator is controlled by a control and processing unit connected to said microwave signal generator.

One embodiment of the dP-measurement device according to the invention comprises a tunable microwave signal generator. A control and processing unit is adapted to cooperate with the signal generator to provide a microwave signal scanning a range of frequencies, said range of frequencies including a resonant frequency of the first microwave resonator.

A still further embodiment of the dP-measurement device according to the invention comprises a second microwave resonator sensor operating as a reference resonator or compensating element for compensating for temperature variations or static pressure changes.

In a yet further embodiment of the dP-measurement device according to the invention an elongated centre element of said microwave resonator is short circuited at one end to an internal wall of one end of said resonator.

In a still further embodiment of the dP-measurement device according to the invention an elongated centre element of the microwave resonator is open circuited at both ends.

A yet still further embodiment of the dP-measurement device according to the invention comprises a helically shaped centre element.

In a still further embodiment of the dP-measurement device according to the invention a the electronic unit which is coupled to the resonator is arranged with a DRO (Dielectric Resonator Oscillator) type coupling, wherein a microwave generator is coupled via a microwave probe to the first microwave resonator which has a flexible or yieldable part or member.

SHORT DESCRIPTION OF THE FIGURES

Figure 5A:
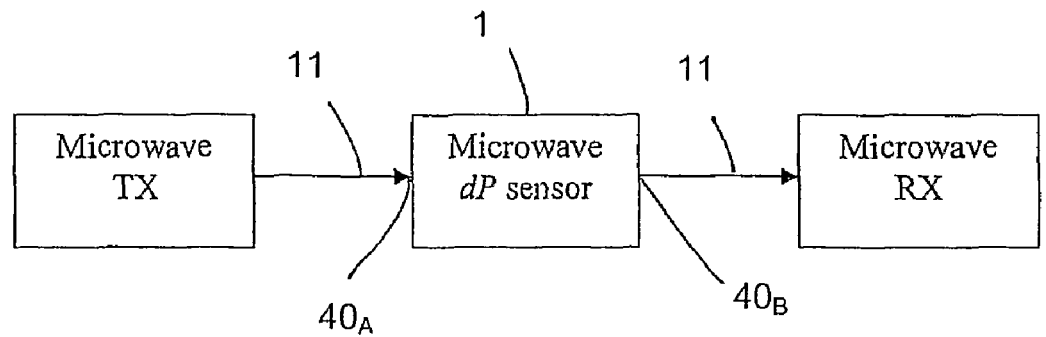
Figure 5B:
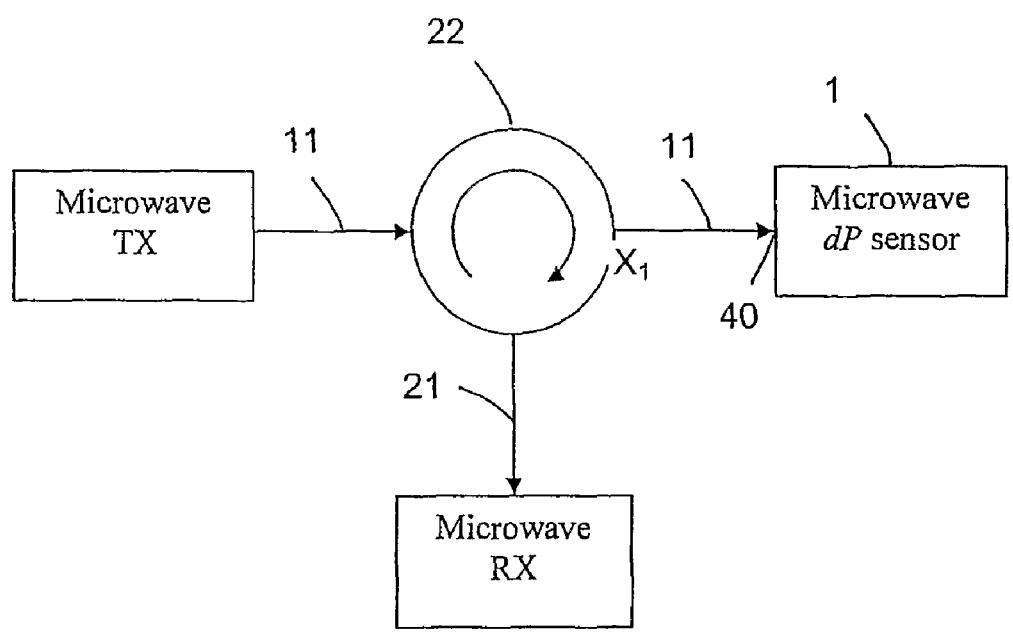

FIGS. 5A-B illustrates in schematic form how a microwave based differential pressure measurement device according to the invention is connected to source and detector modules for operation in transmission mode and reflection mode, respectively.

Figure 6:
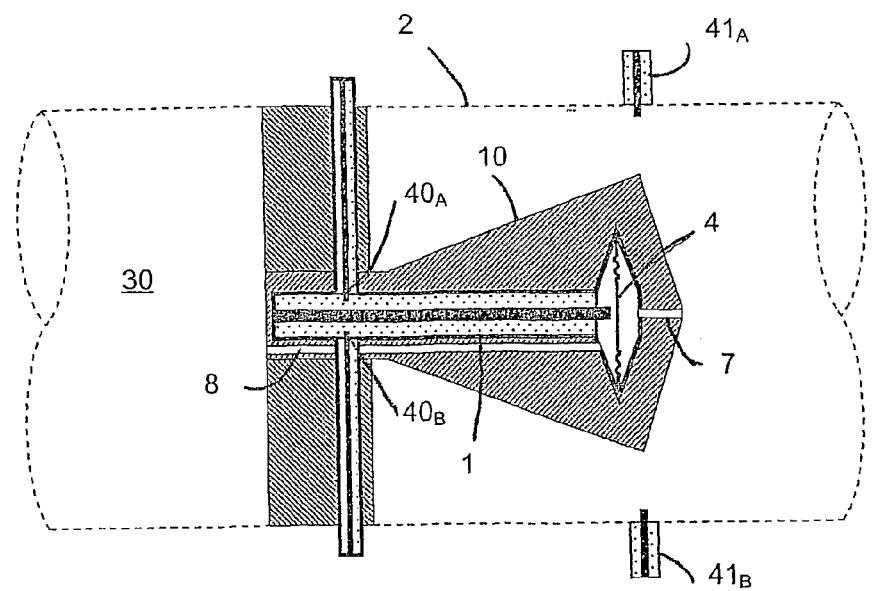

FIG. 6 illustrates how a differential pressure sensitive microwave resonator can be mechanically integrated in a pipeline which is also equipped for wet gas metering using a V-cone centre element.

Figure 7:
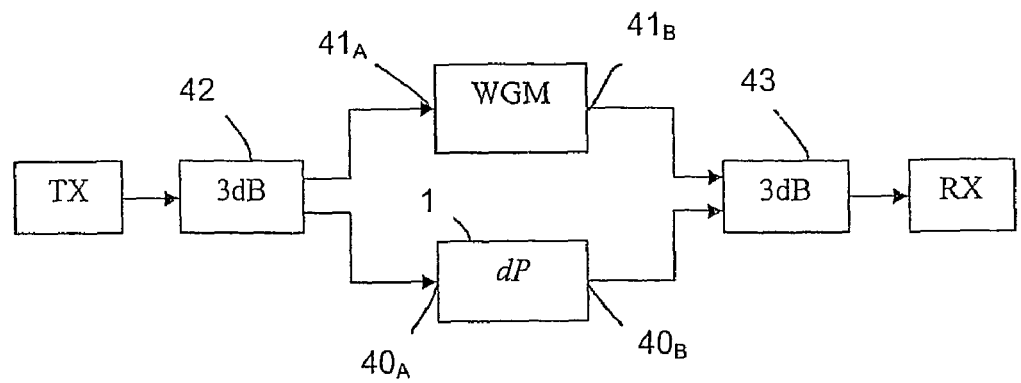

FIG. 7 shows a system sketch of one example design of a microwave circuit for combining a microwave dP-measurement device according to the invention with a wet gas meter as shown in FIG. 6.

Figure 8:
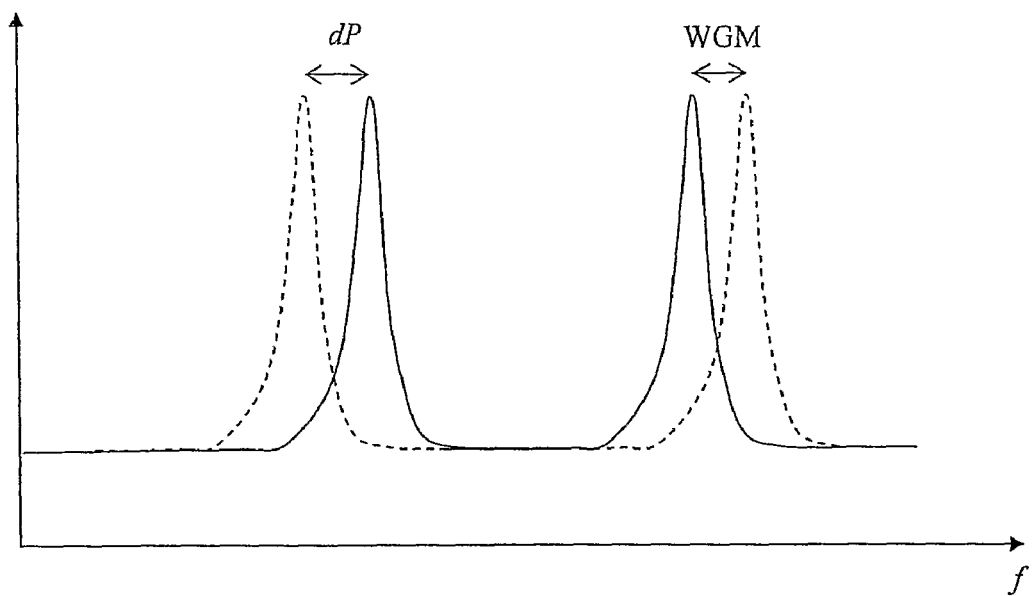

FIG. 8 illustrates a general frequency response of a combination of a microwave dP-measurement device with a wet gas meter as shown in FIGS. 5 and 6.

Figure 9:
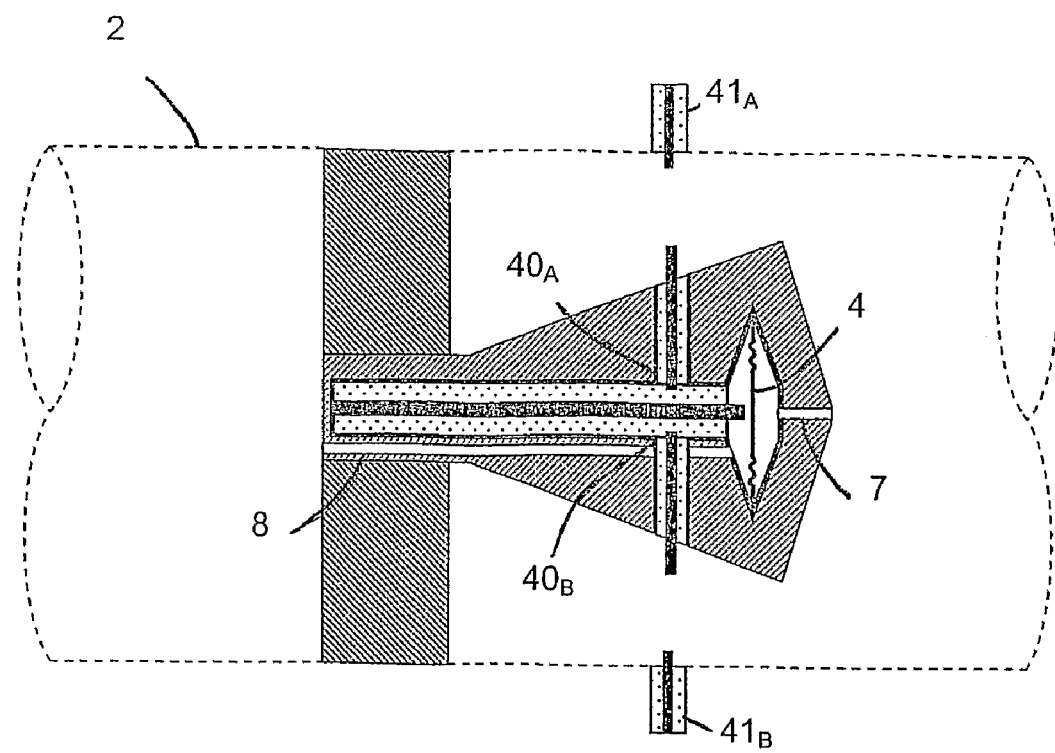

FIG. 9 illustrates how the differential pressure sensitive microwave resonator can be excited via capacitive coupling from the excitation probes in the pipeline wall, which are used also for the excitation of the WGM microwave sensor.

Figure 10A:
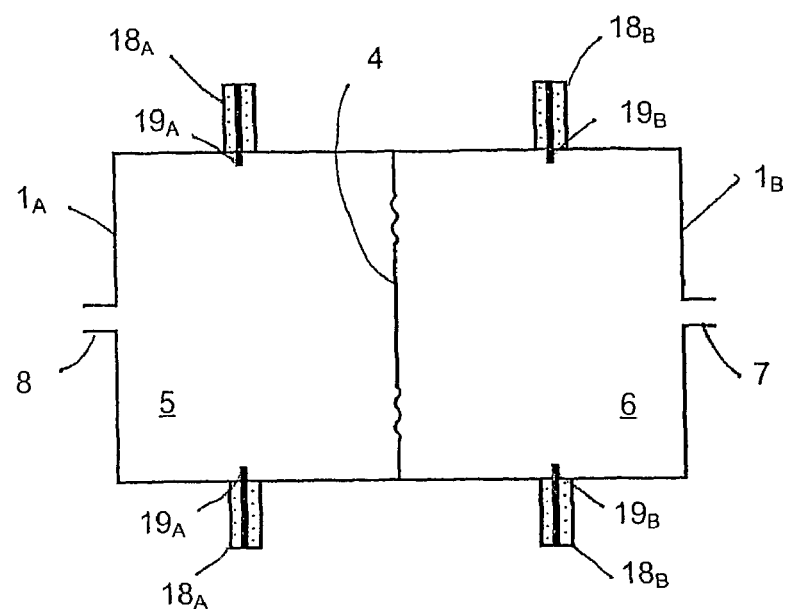

FIG. 10A illustrates an example embodiment of a differential pressure sensitive microwave resonator structure according to the invention designed as a two cavity resonators arranged back to back for temperature compensation.

Figure 10B:
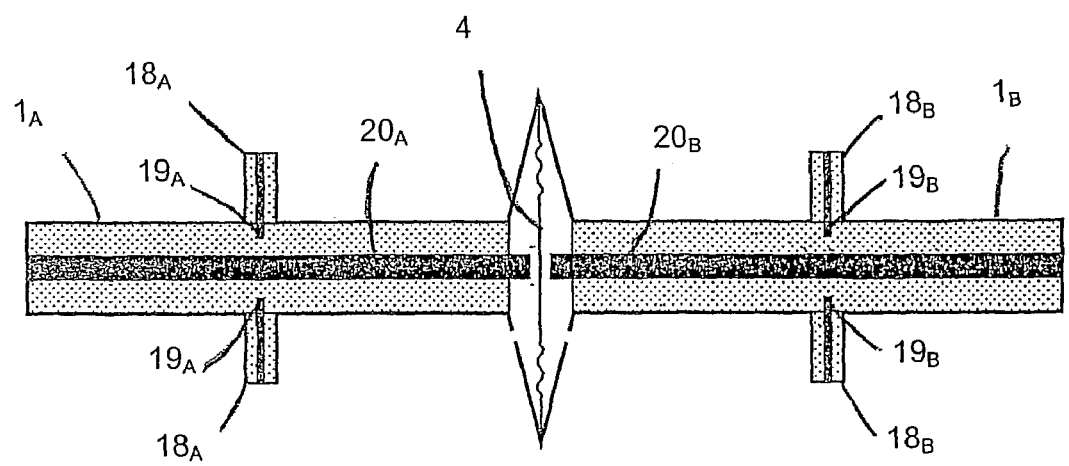

FIG. 10B illustrates an example embodiment of a differential pressure sensitive microwave resonator structure according to the invention designed as two coaxial resonators arranged back to back for temperature compensation.

Figure 11:
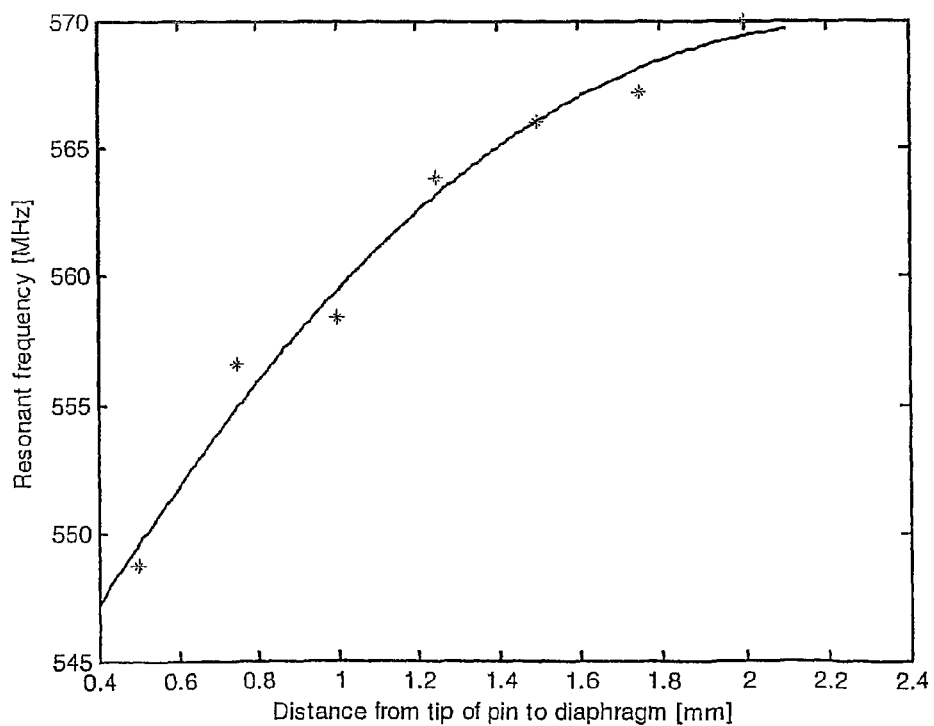

FIG. 11 shows a typical example curve obtained by simulation and which illustrates the dependence of the resonant frequency of the differential pressure sensitive microwave resonator on the distance between the centre pin and the membrane as the membrane moves as a function of the changing differential pressure.

Figure 12:
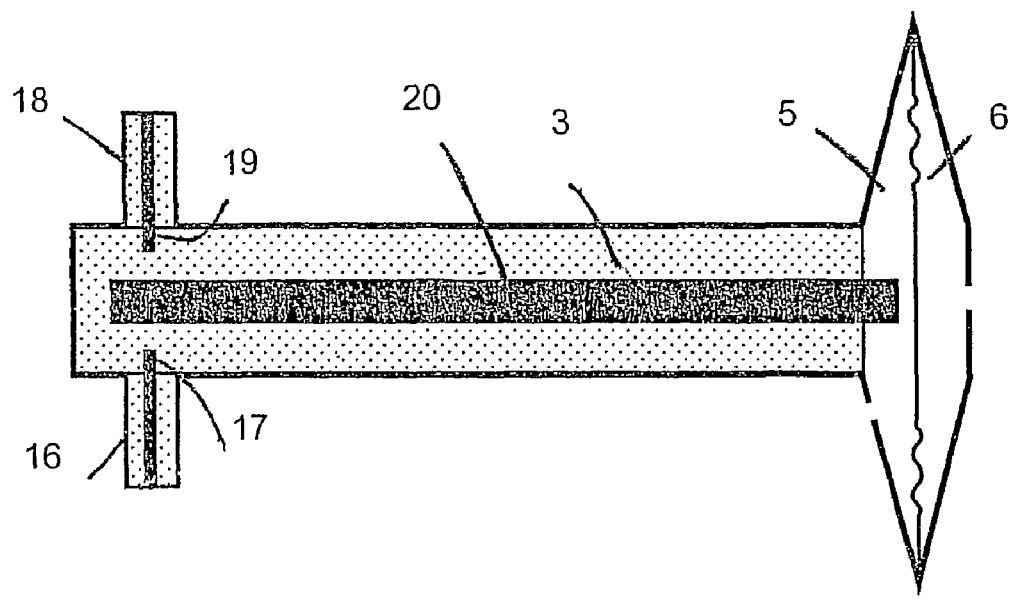

FIG. 12 illustrates an example embodiment of a half wavelength type differential pressure sensitive microwave resonator according to the invention.

Figure 13:
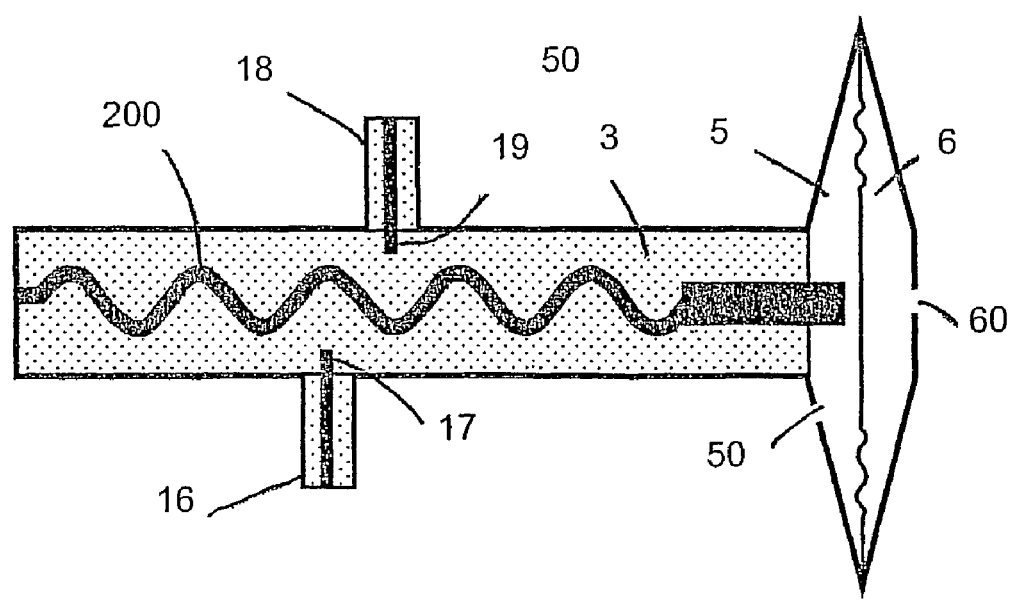

FIG. 13 illustrates an example embodiment of a quarter wavelength type differential pressure sensitive microwave resonator according to the invention.

Figure 14:
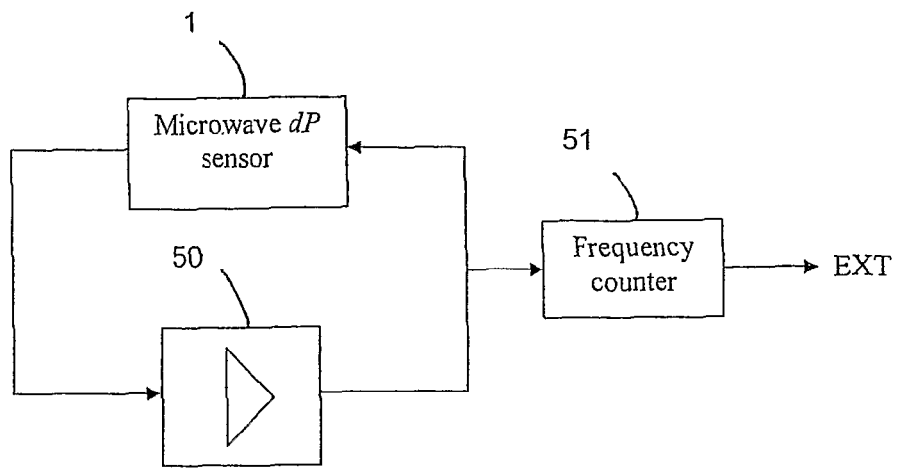

FIG. 14 illustrates a differential pressure sensitive microwave resonator sensor arranged as part an oscillator circuit comprising a feedback loop with an amplifier.

Figure 15:
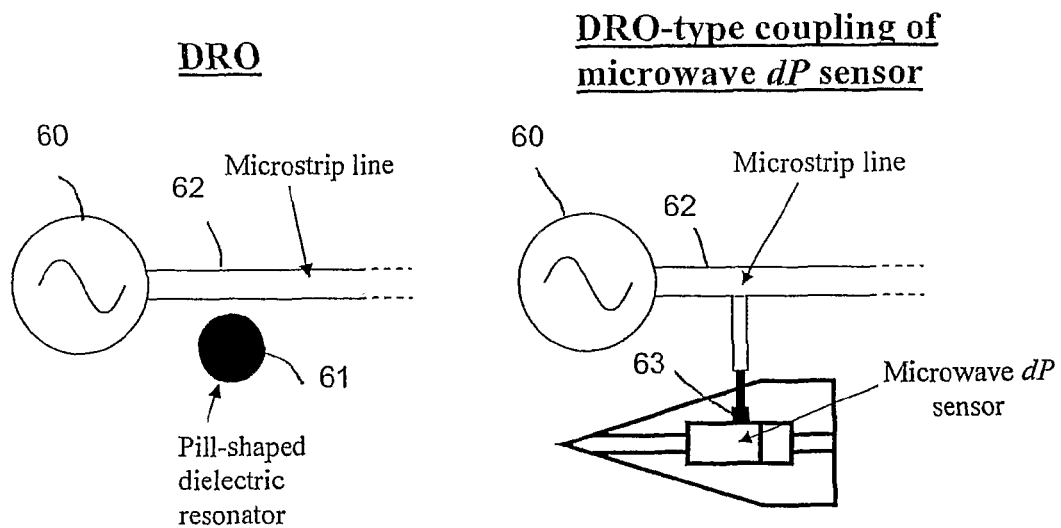

FIG. 15 illustrates a microwave resonator based differential pressure measurement device according to the invention coupled in a way analogous to a so-called DRO (Dielectric Resonator Oscillator),

DETAILED DESCRIPTION OF THE INVENTION

Figure 1:
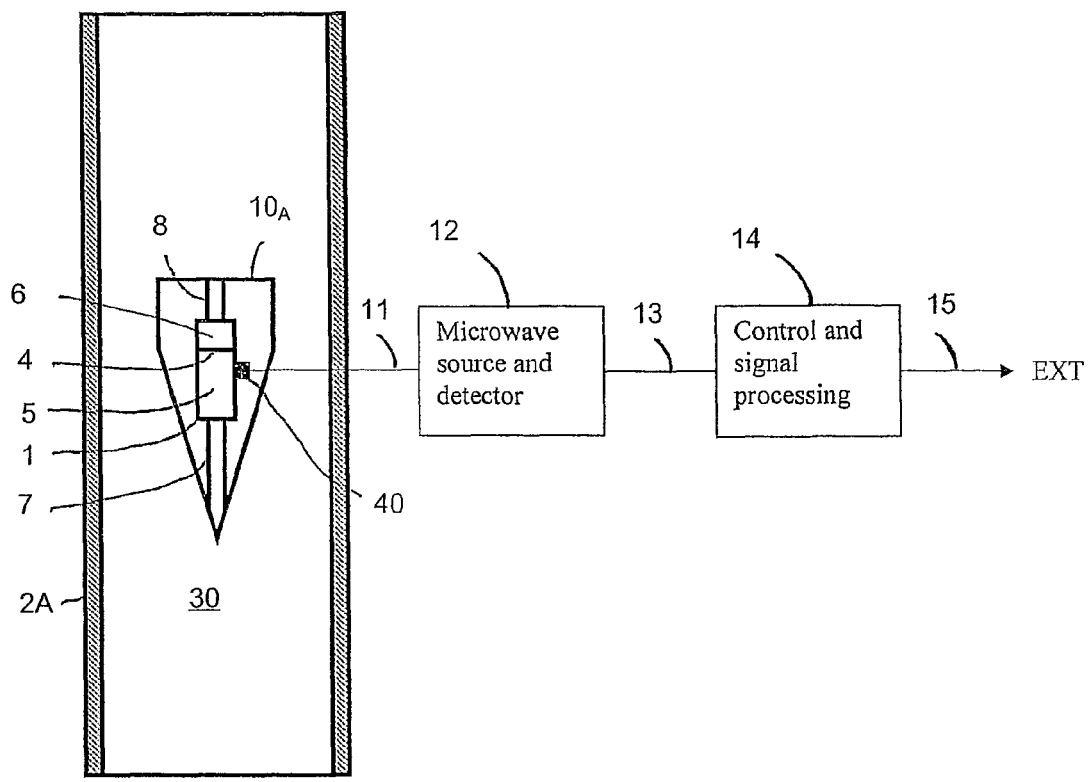
FIG. 1 illustrates an example embodiment of a differential pressure measurement device according to the invention where a differential pressure sensitive microwave resonator sensor is integrated in a V-cone based differential pressure generating centre element in a pipeline.

FIG. 1 illustrates one example embodiment of a differential pressure (dP) measurement device for use in flow measurement wherein a differential pressure sensitive microwave resonator 1 has a flexible or yieldable part or member 4 which deforms or yields when subject to a differential pressure. In this way the microwave resonant frequency of the resonator changes when the dP-measurement device is subjected to a differential pressure. In FIG. 1 the microwave resonator with the flexible or yieldable membrane is integrated in a differential pressure generating structure 10A having a shape resembling a V-cone. The differential pressure generating structure 10A is mounted inside a pipeline 2A, whereby a fluid volume 30 flowing past the differential pressure generating structure 10A creates a pressure differential between an upstream end and a downstream end of the differential pressure generating structure 10A. The flexible or yieldable part or member 4 in this case is a membrane which divides an open interior volume of the microwave resonator into a first volume element 5 and a second volume element 6. The first volume element 5 is coupled to the fluid flow surrounding the differential pressure generating structure 10A via a first channel 7. On FIG. 1 the first channel 7 is open towards the fluid flow 30 at the upstream or front end of the differential pressure generating structure 10A. The second volume element 6 of the interior of the microwave resonator 1 is coupled to the fluid flow surrounding the differential pressure generating structure 10A via a second channel 8. On FIG. 1 the second channel 8 is open towards the fluid flow 30 at the downstream or rear end of the differential pressure generating structure.

Figure 2:
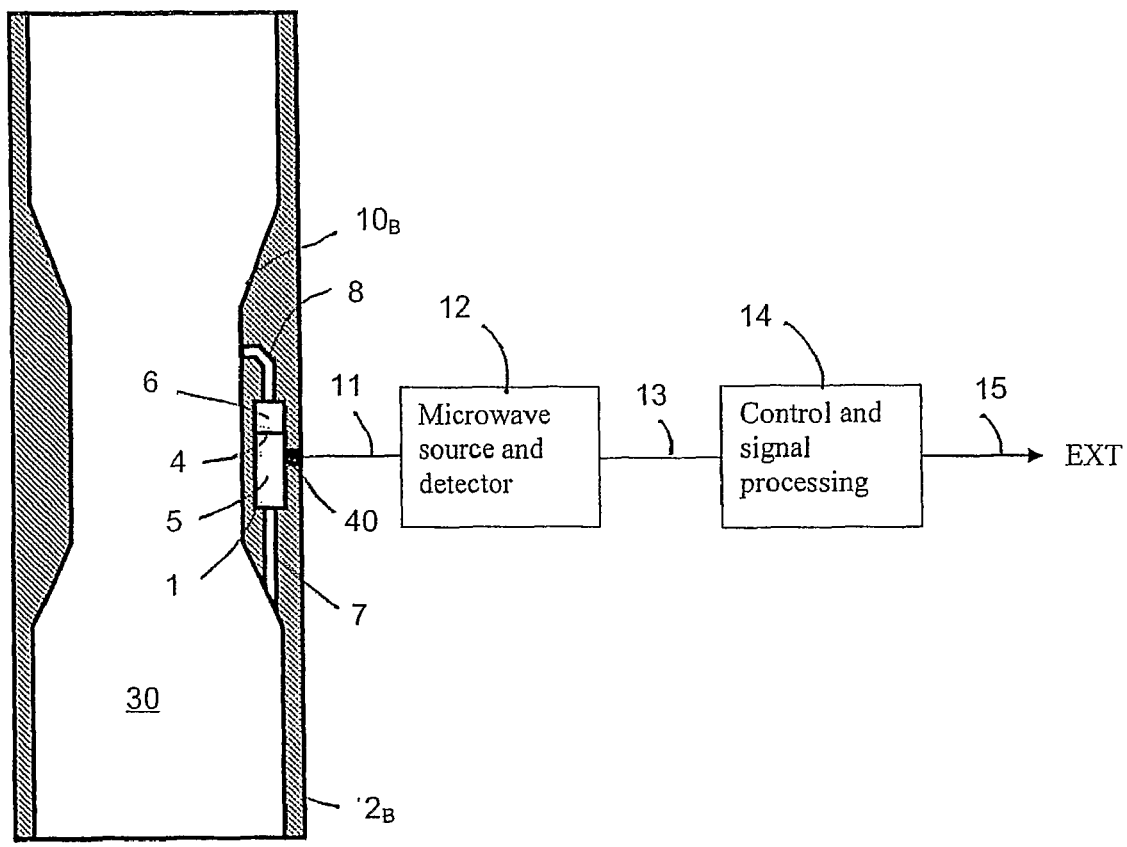
FIG. 2 illustrates an example embodiment of a differential pressure measurement device according to the invention where a differential pressure sensitive microwave resonator is integrated in a Venturi-type differential pressure generating section of a pipeline.

FIG. 2 illustrates one example embodiment of a differential pressure (dP) measurement device for use in flow measurement. In FIG. 2 the differential pressure generating structure 10B is a Venturi tube, i.e. a constriction arranged along a pipeline 2B. In this example a differential pressure sensitive microwave resonator 1 is integrated in the Venturi tube. In a manner similar to the embodiment on FIG. 1, a membrane 4 divides an interior volume of the microwave resonator into a first volume element 5 and a second volume element 6. The first volume element 5 is coupled to the surrounding fluid flow at the differential pressure generating structure 10B via a first channel 7. On FIG. 2 the first channel 7 is open towards the fluid flow 30 at the upstream end or front end of the differential pressure generating structure 10B. The second volume element 6 of the interior of the microwave resonator 1 is coupled to the fluid flow surrounding the differential pressure generating structure 10B via a second channel 8. On FIG. 2 the second channel 8 is open towards the fluid flow 30 at a location somewhere between the upstream and downstream ends of the differential pressure generating structure 10B.

Generally, the differential pressure sensitive microwave resonator of this invention may be designed from a section of any kind of microwave transmission line bounded by impedance discontinuities. A differential pressure sensitive microwave resonator 1 may be obtained by designing a resonator cavity having a deformable, yieldable part, which causes the resonator to alter its physical shape as a result of application of a differential pressure, due to an associated change in the resonant frequency of the resonator. For example, a cavity resonator could have an end wall which is a flexible membrane which faces a first volume of an external environment on one side and the inside of the resonator cavity on the other side, and where the hollow cavity is provided with an opening towards a second volume of the external environment. This way a differential pressure between the first and second volumes causes a deformation of the flexible membrane and a shift in its resonant frequency.

In FIG. 1 as well as in FIG. 2 it is illustrated that the dP-measurement device according to the invention is shown to include a microwave source & detection unit 12 as well as a control & signal processing unit 14. The microwave source and detection unit 12 is connected to the microwave resonator 1 via at least one microwave signal conductor/guide 11 and a microwave probe 40. The function of the microwave source and detection unit 12 is to launch an amount of microwave energy towards the microwave resonator and to detect a corresponding reflected amount of microwave energy from the microwave probe/resonator combination. A control and signal processing unit 14 is connected to the microwave source and detection unit 12 via, for example, a communication line 13. The function of the control and signal processing unit 14 is to control the microwave source and to record microwave signal levels at the detector. It is the intention that at least the frequency or the amplitude of the microwave signal may be controlled, but possibly a control of a modulation or scanning of the microwave signal can also be envisaged. Further, the control and signal processing unit may be adapted to perform some form of processing of the amplitude of the detected microwave signal, possibly as a function of frequency, time or other varying signal parameter. Further, the control and signal processing unit 14 is adapted to communicate with an external device (EXT) via any type of communication line 15 known to a person skilled in the art.

The differential pressure sensitive microwave resonator 1 on FIGS. 1 and 2 is based on a resonator including an associated deformable or yielding membrane 4 which separates said cavity in a first 5 volume and a second 6 volume. If a pressure difference exists between the first volume 5 and the second volume 6 the membrane 4 will yield or deform to an extent depending on the size of the pressure difference.

A person skilled in the art will appreciate, having the benefit of this disclosure, that the principle of this invention is not intended to be limited to the embodiments of the invention shown in the appended figures, rather a range of shapes and sizes of the differential pressure sensitive microwave resonator could be envisaged that would achieve the objectives of this invention.

The first volume 5 and the second volume 6 of the microwave resonator 1 according to the invention are provided with separate fluid couplings 7, 8 to enable each of the volumes 5,6 to be coupled to different fluid 30 volumes within the pipeline 2A, 2B. Typically, the fluid couplings 7, 8 are channels from the chambers 5, 6 ending in a pair of taps or inlets/outlets which may be open into the fluid 30. These inlets/outlets are pressure taps placed at two different positions relative to a differential pressure generating structure 10, such as e.g. a V-cone arranged in the pipeline or a Venturi-tube in a section of a pipeline. In this way the hydrodynamic pressure outside each outlet may be different when a fluid flows through the pipeline passing by the differential pressure generating structure, and the size of the differential pressure thus appearing between the two chambers 5, 6 will depend on the rate and composition of the flowing fluid, the design of the differential pressure generating structure 10, and the location of the fluid couplings 7, 8.

Figure 3:
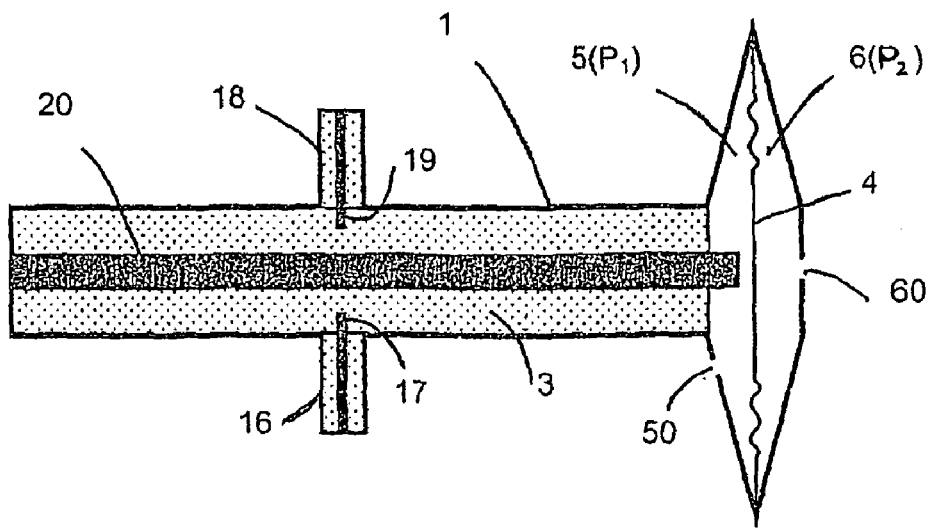
FIG. 3 shows a detailed example of the microwave resonator of the differential pressure sensor according to the invention.

FIG. 3 illustrates in more detail the design of one differential pressure sensitive microwave resonator 1 of the invention. A dielectric material 3 fills most of the internal volume of the resonator, however at one end a volume 5, 6 is defined, divided in a first volume 5 and a second volume 6 by a membrane 4. Two microwave probes 16, 18 are arranged to couple microwave signals into and out of the resonator. One centre conductor 17, 19 of each of the microwave probes 16, 18 extend some distance into the resonator volume in order to couple with a microwave field. The microwave resonator 1 in the example shown on FIG. 3 is based on a coaxial waveguide like structure that includes a coaxial centre pin 20 which is short circuited to the interior wall of the resonator at one end and open circuited at a second end, the second end facing, but not touching, the membrane 4. The centre pin 20 is almost completely enclosed by the dielectric material 3 that fills most of the interior volume of the microwave resonator. However, one end of the centre pin 20 extends out of the dielectric 3 and into an open cavity 5, 6 which allows some movement of the membrane 4. The open cavity 5, 6 which is divided in two separate volumes by the membrane 4 can be designed so to limit the freedom of movement of the flexible membrane 4, in order that the walls of the open cavity 5, 6 helps to prevent the membrane from breaking by effectively stopping the movement of the membrane when flexed or extended to one of its most extreme positions.

For the principle of the invention to work, the membrane should be made of an electrically conducting material, for example a metal. The first volume 5 of the open membrane cavity 5, 6 is provided with an opening 50. Typically, the opening 50 will be coupled to a an external flow environment via a channel 7, where the said channel may be a part of a differential pressure generating structure or a part of the wall of a pipeline or a combination of these. The pressure inside the first volume, denoted $P_1$, depends on the fluid pressure at the exit of the channel 7 into the fluid flow, alternatively the pressure may depend on the pressure just at the opening 50.

Similarly, the second volume 6 of the open membrane cavity 5, 6 is provided with an opening 60. Typically, the opening 60 will be coupled to a an external flow environment via a channel 8, where the said channel may be a part of a differential pressure generating structure or a part of the wall of a pipeline or a combination of these. The pressure inside the second volume, denoted $P_2$, depends on the fluid pressure at the exit of the channel 8 into the fluid flow, alternatively the pressure may depend on the pressure just at the opening 60.

The microwave resonator 1 shown in FIG. 3 is excited by a signal entered into the resonator via one of the microwave probes 16 and 18, the other probe being used as a sensing probe for measuring the microwave field in the resonator. With a microwave resonating cavity open circuited at a first end of the resonator cavity and short circuited at a second end of the resonator cavity, the lowest resonant frequency corresponds to the cavity being a quarter-wavelength long.

In many embodiments of the invention the differential pressure sensitive microwave resonator 1 can be provided with an open circuit for the microwave signal at both ends of the resonating cavity. Thus, the resonating cavity will be a half-wavelength long at the fundamental resonance frequency.

When the membrane is deformed by the differential pressure the gap between the membrane and the end of a centre conductor rod changes, whereby the resonant frequency of the resonator also changes. The relation between the differential pressure and the resonant frequency can be calibrated empirically for each type of resonator sensor. Preferably, a coaxial sensor is a $\lambda/4$ resonator (where $\lambda$ is the wavelength) for the mode with the lowest resonant frequency, but the resonator will also have higher frequency resonances, which may also be used. It is not the intention of this description to limit the scope of the invention to any particular microwave resonator structure or any resonance mode of the microwave resonator.

Figure 4:
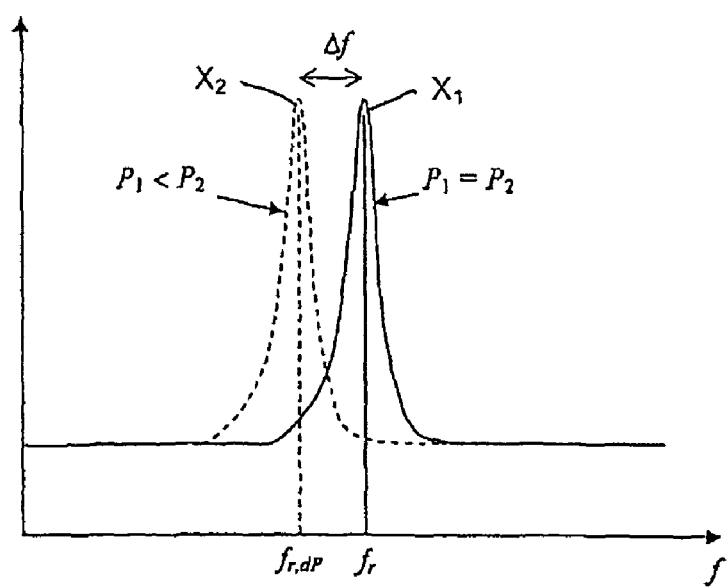
FIG. 4 shows a typical frequency response of a differential pressure sensitive microwave resonator sensor.

FIG. 4 illustrates a typical characteristic resonance curve where it is illustrated how the resonance peak $X_1$ corresponding to a resonance frequency changes to a resonance peak $X_2$ when the pressure sensitive microwave resonator 1 experiences a change in the differential pressure across the membrane 4. In FIG. 4 it is illustrated the example of a shift in the resonance frequency to a lower frequency when the pressure in the first volume 5 of the cavity 5, 6 becomes lower than the pressure in the second volume 6.

There are several methods of obtaining a measure of the resonant frequency of a microwave resonator sensor and several types of coupling probes could be used. In one method described in Ref. [5] the microwave coupling probe is formed by terminating a coaxial feeding cable 16 at the microwave resonator 1 in such a way that a centre conductor 17 of the feeding coaxial cable 16 extends some distance into the resonator in order to create a coupling probe. In another example a microwave coupling probe could be designed by terminating a coaxial feeding cable 18 at the microwave resonator 1 by extending the centre conductor 19 of the coaxial cable some distance into the resonator and bending the centre conductor to ground it to the wall of the resonator, thereby creating a coupling loop. Preferably the size of the loop is made smaller than the wavelength of the microwave signals. In yet another example a waveguide could be used as the feeding transmission line connecting the microwave signal generator to the microwave resonator sensor. In this case the coupling device is preferably an aperture in the waveguide wall or waveguide end allowing a field of the feeding transmission line to penetrate the aperture and into the resonator. In all examples the coupling probe, coupling loop, or aperture is preferably designed so as to provide optimum coupling between a field of the feeding transmission line and a field of the microwave resonator.

In one example embodiment of a microwave resonator based differential pressure measuring device according to the invention the transmission method is utilized, as illustrated in FIG. 5A. In the transmission method a microwave signal is generated in the microwave signal source or transmitter part in a microwave electronics unit (µW-Tx). The microwave signal is transferred to the microwave resonator sensor 1 via microwave transmission lines 11, e.g. a set of coaxial cables. The microwave signal is coupled to the microwave resonator sensor 1 via a first microwave coupling probe 16, 17. A second microwave coupling probe 18, 19 is used to sample the electromagnetic field in the microwave resonator sensor, and this sampled microwave signal is transferred to the microwave detection or receiver part of the microwave electronics unit (µW-Rx) via a separate, second set of coaxial cables 11. The microwave coupling probes can be of several forms, examples of general types are illustrated in ref. [5].

The control and signal processing unit 14 typically comprises a computing unit, e.g. a computer is provided for controlling the measurement procedure and for recording, processing and analysing the detected signals. The frequency of the microwave generator or transmitter may be scanned or varied over a given frequency range, preferably a range covering the resonant frequency of the microwave resonator relevant to measure. A result will then be a frequency response of the transmission coefficient.

In another embodiment of the microwave resonator based differential pressure measurement device according to the invention utilizes the reflection method, schematically illustrated in FIG. 5B. In the reflection method only one microwave probe is required. The microwave detection unit 12 and the control and signal processing unit 14 (which together with the microwave source can be denoted the microwave electronics unit) is adapted to measure the reflected microwave signal and compute a corresponding reflection coefficient of the microwave resonator. When the microwave generator is controlling the microwave source signal frequency, information is obtained on the reflection coefficient as a function of microwave signal frequency.

The microwave signal source (µw-Tx) may supply a signal to the microwave resonator 1 via a circulator 22 as indicated in FIG. 5B. The circulator 22 allows a microwave signal reflected from the microwave resonator (µw-dP) 1 as a result of the excitation to be directed along a separate transmission line 21 to the microwave detection unit (µw-Rx)

In the transmission method and in the reflection method a peak or dip appears at and around the resonant frequency in the frequency responses. In the transmission method a peak appears in the frequency response. In the reflection method a dip appears in the frequency response. The control and signal processing unit is adapted to determine the resonant frequency (and in some applications also the Q-factor) of the microwave resonator from these peaks or dips in the frequency responses.

Above, it is described how the invention can operate as a MW-dP (microwave differential pressure) sensor, which can be useful as a standalone dP-sensor in a number of technical areas, for example oil and gas industry or exploration projects.

In a preferable embodiment the MW-dP sensor is combined with a microwave resonator arrangement for measuring the permittivity in a volume of the flowing fluid. Combining traditional differential pressure measurements and permittivity measurements has been described previously, for example in ref. [2]. However, combination of a differential pressure sensitive microwave resonator according to the present invention with a microwave based permittivity measurement brings into such a device totally new advantages, in so far as the differential pressure measurement can be performed in the same module and many of the same modules, for example the microwave source, detection and signal processing modules can be used to perform the permittivity as well as the differential pressure measurement. The MW-dP sensor has several advantageous features as compared to traditional dP-measurements. When used in combination with a microwave based WGM a number of additional advantages are obtained, as will be mentioned below. For example, by using a switching or multiplexing arrangement it is possible to use the same microwave source and microwave detector for the MW-dP sensor as well as for the permittivity resonator sensor. Hence the number of required components may be reduced.

The microwave detection function is adapted to obtain a measure of the microwave energy reflected from or transmitted through the microwave resonator 1. Typically, a control unit 14 is provided for controlling the microwave signal generator, e.g. via the microwave signal frequency and/or amplitude. The same control unit 14 or a separate unit is provided for converting the detected microwave signal into a signal representing the amplitude of the detected microwave signal. The control and signal processing unit 14 is adapted for recording, collecting and analysing information or data representing the detected microwave signal amplitudes, in particular at or around given frequencies or frequency bands, possibly at preset sampling times and/or intervals.

The recorded and collected data or information representing the signal amplitude of the detected microwave signal is processed in a computing device, for example with a digital microprocessor, in order to obtain information on the resonant frequency of the microwave resonator. This way, a differential pressure causing a deformation of the membrane of the microwave resonator results in a corresponding change in the obtained resonant frequency which is transformed into a signal which is made available to external units (EXT) via e.g. a communications link 15.

In a further embodiment of the microwave resonator based differential pressure device according to the invention the differential pressure sensitive microwave resonator 1 is part of an oscillator circuit. The oscillator circuit may for example be formed by an amplifier with positive feedback through the resonator sensor, as described in ref. [5, 6]. One way of realizing this is illustrated in FIG. 14, where the oscillator circuit comprises a differential pressure sensitive microwave resonator sensor 1 connected in a feedback loop with an amplifier 50. The oscillation of the electronic oscillator circuit will then be locked to the resonant frequency of the microwave resonator 1. In this case the resonant frequency may be determined simply by counting the oscillation periods using a frequency counter 51 connected to the oscillator circuit.

In yet another embodiment of the microwave resonator based differential pressure measurement device according to the invention the coupling is arranged in a way analogous to a so-called DRO (Dielectric Resonator Oscillator), where an oscillator 60 is locked to the resonant frequency of a dielectric pill-shaped resonator 61. The coupling is then arranged through the fringing electromagnetic field around the dielectric resonator 61 and a microstrip line 62 by gluing the resonator on the circuit board close to the microstrip line, as illustrated on the left part of FIG. 15.

In the MW-dP-case a DRO-type coupling can be achieved using a microwave coupling probe 63 and some kind of a microwave transmission line 62. The choice of method of measuring the resonant frequency is not critical to the invention, and any method could in principle be used. The probes, cables, and the electronics are not part of the microwave resonator sensor itself and hence do not affect the measurement in any way It is important to note that various types of probes can be used, in general, as described in [4, p. 145-9]

Although the differential pressure measurement device according to the invention in the above has been described with a single differential pressure sensitive microwave resonator, a person skilled in the art and having the benefit of this description, will understand that a large number of differential pressure measuring devices according to the invention can be utilized in combination in order to obtain more differential pressure measurement data or provide redundancy in the differential pressure measurement. Any number of differential pressure measuring devices that it is practical to arrange around one or more differential pressure generating structures 10A, 10B, may in principle be used. Using several differential pressure measuring devices arranged either in parallel or series, or a combination of both of these arrangements will normally provide improved data on the flow. The actual number of dP-devices used, will normally be a result of a cost-benefit analysis in a practical installation and related to the main objectives of a user, e.g. the total economics of a fluid metering project.

When the differential pressure sensitive microwave resonator according to this invention is combined with a fluid (30) permittivity sensitive microwave resonator sensor, e.g. with a microwave resonator sensor for measurement of the permittivity of the fluid 30 flowing in the pipeline 2, a reduction in complexity of the combined solution shown in ref. [2] is possible. Several parts of electronics unit can be used to serve both as part of the dP-measurement and as part of the permittivity measurement, as both measurements now can be performed as a measurement of a microwave resonator. Several arrangements are then possible:

- The sensors can be coupled to the electronics unit one at a time using switches (which are controlled by the computing device). This results in two different frequency responses.
- The sensors can be coupled to the microwave electronics unit using power dividers and combiners. This results in one frequency response having two resonance peaks. In order to discriminate between the two resonators, it is important that the two microwave resonator sensors are designed to have resonant frequencies which have sufficient separation to avoid confusion, when the peaks move with the measured quantities, i.e. the differential pressure and the dielectric permittivity of the flow in the case of the Roxar WGM.
- The MW-dP-sensor may be located inside the other microwave sensor and the measurement signal coupled from the field in the WGM resonator sensor through probes. Also this method results in one frequency response with two resonance peaks.

Locating the MW-dP-sensor inside another microwave resonator sensor is particularly attractive in a wetgas meter having a V-cone element for generating a differential pressure (e.g. the Roxar WGM). In this case the V-cone element serves a twofold purpose, first it generates the differential pressure and, second, it acts as part of a microwave resonator structure [2, 7] for measuring the permittivity of a flowing fluid as part of obtaining a measure of the composition and flow rate of the flowing fluid. In this case a bi-conical body is kept in place in the centre of the flow pipe by a support structure. When a fluid flows in the pipeline a differential pressure is created over the V-cone element. The MW-dP-sensor can be integrated into the cone with pressure taps in both ends of the V-cone element, as illustrated in FIG. 6.

Ducts or channels 7, 8 transfer the fluid pressures at the taps from the volume outside the taps and into the resonator cavity of the MW-dP-sensor. These ducts or channels can be made relatively short, and will be less subject to clogging than in traditional differential pressure measuring devices because the ducts or channels are at substantially the same temperature as the flowing fluid. The coupling to the MW-dP-sensor inside the V-cone element can be arranged using any of the methods described above. If coaxial cables are used, they can be hidden inside the supports that keep the centre body in place, three radial plates in the case of the Roxar WGM. It is important to note that the invention is not in any way limited to the use of a V-cone element, which is here used only as an example. The same arrangement can be used also with differential pressure generating bodies of other shapes.

In yet another embodiment of the microwave resonator sensor device according to the invention the resonator cavity of the sensor could be integrated or built into a pipeline wall, or alternatively the resonator cavity of the sensor could be mounted on the outside of the pipe as a separate unit, in both cases with pressure taps or channels running in the wall of the pipeline and into the interior of the pipeline.

The device illustrated on FIG. 6 may be connected up as shown in FIG. 7. A microwave source (TX) supplies a microwave signal to a first microwave signal coupler 42, e.g. a 3 dB coupler, which divides the microwave signal in two parts, a first output providing a first microwave signal being guided to a first probe 41A on a WGM-device and a second output providing a microwave signal being guided to a second microwave probe 40A on a dP-device according to this invention. When both the WGM as well as the dP-device is operated in transmission mode a third microwave probe 41B on the WGM-devices couples some of the microwave energy resonating between the differential pressure generating structure 10 and the pipeline 2A or 2B via a signal transmission device to a first input of a second microwave signal coupler 43, which could also be a 3 dB coupling device. A fourth microwave probe 40B couples some of the microwave signal energy from the differential pressure sensitive microwave resonator via a signal transmission device to a second input of the second microwave signal coupler 43. A combined microwave signal at the output of the second microwave signal coupler 43 is coupled to a microwave signal detector in a receiver unit (RX). It is assumed, although not shown on FIG. 7, that the microwave source (TX) and microwave receiver (RX) will be connected to a control unit and a signal processing unit as illustrated in combined form in FIGS. 1 and 2 for performing the minimum of control, processing/analysing functions.

The dimensions of the microwave resonator defined by the combination of the differential pressure generating structure and the pipeline and the combination of the microwave resonator cavity 3, 5, 6 and the membrane 4 are so different that the resonant frequency will be relatively different for these two, as illustrated in FIG. 8.

The resonant frequency for the microwave resonator defined by the differential pressure generating structure and the pipeline and the resonant frequency for the microwave resonator defined by the microwave resonator cavity 3, 5, 6 and the membrane 4 are chosen by design of the dimensions of the components so that the two resonant frequencies are separated conveniently in frequency. The two resonant frequencies should not be too close to overlap and confusion, but can be close enough to make it possible to perform measurements of both resonant frequencies with a single VCO, which typically covers one octave.

In FIG. 8 the two resonant frequencies are well separated and may easily be distinguished in a measuring circuit. Other designs of the combined WGM/dP-device will be possible, however, it is a requirement that the two resonant frequencies may be sufficiently well separated to achieve the required accuracy in the measurement. Design compromises may be necessary to achieve the required characteristics of the device.

In some embodiments of the invention the internal cavity of the microwave resonator can be filled by a protective liquid, e.g. silicone oil, preventing corrosion and deterioration of the interior of the cavity. Further, the ducts or channels between the microwave resonator cavity and the surroundings may have protective seals (remote seals) in order to maintain the protective liquid inside the cavity and to protect against external fluids entering into the channels, ducts or the microwave resonator cavity. Such protective seals can be designed in such a way that external pressure changes are transferred through the seals and into the cavity. As an example the protective covers can be bellow-shaped. It may be a disadvantage of such protective seals/remote membranes that they tend to inhibit the transfer of pressure changes into the microwave resonator cavity, thus reducing the effect of differential pressure changes on the resonant frequency of the microwave resonator. Liquid filled spaces (pipes/channels/cavity) may also affect the measurements due to an additional pressure effect from the height of the pipe or channel. Thermal expansion/contraction of a protective liquid contained within the pipe/channel/resonator may also cause undesirable pressure build-up or pressure reduction inside the microwave cavity.

FIG. 9 illustrates one preferable embodiment of the invention in which only one pair of microwave probes $41_A$, $41_B$ is used to interface signals to and from the permittivity measurement components as well as to the differential pressure measurement components inside the pipeline 2. In this embodiment the microwave probes $40_A$, $40_B$ of the differential pressure sensitive microwave resonator are arranged to face the microwave probes $41_A$, $41_B$, in order that the microwave signals may couple between the microwave probes on the pipeline $41_A$, $41_B$ and to the microwave probes $40_A$, $40_B$ on the differential pressure sensitive resonator 1 through the mutual capacitance between the probes $40_A$ and $41_A$, and $40_B$ and $41_B$ respectively. In this way a switching between the measurement of permittivity and the measurement of differential pressure is achieved by switching the frequency of the microwave source, and possibly at the same time switching between corresponding algorithms in the signal processing unit.

FIG. 10A illustrates a basic embodiment of a differential pressure sensitive microwave resonator 1 for obtaining temperature compensation in which a membrane 4 separates a first 5 and a second 6 microwave resonator cavity. Ducts or channels 7, 8 that transfer a fluid pressure from pressure taps (not shown) will, if the pressures are different at the pressure taps, create a differential pressure across the membrane 4, causing a deflection of said membrane 4. A temperature change causes a change in the characteristics of the microwave resonators, partly due to thermal expansion, a change which is of the similar size and shifts the resonance frequency in the resonators in the same directions. Hence, by providing signal processing functionality capable of estimating an average resonance frequency for the two microwave resonators a measure of the drift which is common to the two microwave resonators, for example due to a temperature change can be estimated. The cavity 5 of the first microwave resonator 1A is excited via two microwave probes 18A having terminations 19A inside cavity 5, while the cavity 6 of the second microwave resonator 1B is excited via two microwave probes 18B having terminations 19B inside cavity 6.

FIG. 10B illustrates yet another possible embodiment of the differential pressure sensitive microwave resonator 1 for obtaining temperature correction wherein the two coaxial waveguide based microwave resonators of the same type are aligned with a common membrane 4 separating the two resonator volumes. When deflected by a differential pressure, this changes the two resonators in substantially similar amounts, but in opposite directions. Temperature changes normally alters both resonators in the same, but opposite manner, hence by calculating the difference in resonance frequency between the two resonators, a temperature compensated measure of the differential pressure across the device is obtained. In this device also, two microwave probes 18B are used to launch and to detect microwave signals into and from, respectively, a first resonator 1A having a centre pin 20A short circuited at a first end of the device, while two other microwave probes 18A are used to launch and to detect microwave signals into and out of a second resonator 1B having a second centre pin 20B short circuited to the resonator wall at a second end of the double resonator device. Apart from the centre pins 20A, 20B most of the internal volume of the waveguide resonators is filled with a dielectric material, while a volume around the membrane 4 remains void, to allow for movement of the membrane 4.

The microwave resonator based differential pressure measuring device may be designed with two coaxial sensors, having a common yielding or deformable membrane as a separating wall between the resonator cavities of the two resonators. One example embodiment of such a coaxial microwave resonator is illustrated in FIG. 10. When the membrane 4 is deformed, the resonant frequency shifts in opposite directions for the two microwave resonator sensor cavities 5, 6 while e.g. temperature changes cause the frequency to shift in the same direction in both sensors. By measuring the resonant frequency of each resonator separately as described above, and adding a calculation of the difference in frequency between the two obtained resonant frequencies, an automatic compensation for temperature effects is achieved.

FIG. 11 illustrates the dependence of the resonant frequency of a typical single microwave resonator as a function of the distance from the tip of the centre pin 20 to the membrane 4. The resonant frequency increases with increasing separation between the centre pin 20 to the membrane 4. The differential pressure changes this separation, and hence the resonant frequency by deflecting the membrane.

In another alternative embodiment of this invention, illustrated in FIG. 12, the centre pin 20 is open circuited at both ends, i.e. not connected to the wall of the microwave resonator cavity at either of its ends. In this case the microwave cavity will be a half wavelength long at the fundamental resonant frequency. Such a half wavelength version is an advantage in so far as the sensor may be integrated in the differential pressure generating structure, e.g. the V-cone, and it may often be desirable to have the microwave probes located at the same position or close to the position of the attachment legs for the V-cone. This is so because in the half-wavelength version there is maximum field strength at both ends, that is, in the end where the probes are connected. The probes give the best coupling at the position where they are near a field maximum.

In yet another alternative, illustrated in FIG. 13, the centre "pin" 200 will be designed in the form of a helix. In this case a low resonant frequency is achieved while keeping the differential pressure sensitive microwave resonator small. This can be an advantage, because in this case it may in some cases be possible to measure both resonances in a combined WGM/dP measurement device, as the two resonance frequencies then may be close to each other. This is a means of adjusting the resonant frequency of the differential pressure sensitive microwave resonator so as to be on a convenient distance from the resonant frequency of the permittivity measuring device, i.e. far enough to avoid confusion taking into account the range of change of both, and close enough for both to be within the range of a single VCO.

It will be understood that the differential pressure sensitive microwave resonators of FIGS. 12 and 13 may also be designed in configuration mirrored about the membrane 4 in order to form two microwave resonators of the same type aligned back-to-back with a common membrane 4 separating the two resonator volumes, in order to provide for the possibility of temperature correction in the same manner as the configuration illustrated on FIG. 10B.

It may be possible also to provide a sensor for absolute pressure by designing a resonating sensor where the membrane 4 is made very stiff and by closing one of the openings 50, 60 into the cavity containing the membrane.

It is also possible to provide a temperature sensor by excluding the membrane 4 altogether. In this case the temperature dependence of the microwave resonator depends on the thermal expansion of the metal parts, and on the temperature dependence of the permittivity of the dielectric material inside the microwave resonator 1. The arrangement on FIG. 10A or 10B can also be used for deriving the temperature. The resonant frequencies move in opposite directions as a function of the differential pressure, but in the same direction as a function of the temperature. Therefore, an estimate of the mean frequency can be used as a measure of the temperature.

In one alternative the microwave resonator based differential pressure measuring device according to the invention is provided with an auxiliary microwave resonator sensor having a stationary membrane. This auxiliary microwave resonator sensor then acts as a reference unit, thereby enabling compensation for temperature and possibly also for other long term effects affecting both resonator sensors in the same manner. Two resonators can in this case be coupled to the same electronics unit, the first resonator is a differential pressure sensitive resonator and the second resonator is a reference resonator, the first and second resonator being substantially similar in shape and material, whereby their temperature dependencies are largely similar.

A number of advantages are obtained by this invention:

With the MW-dP-sensor mounted inside a V-cone element the risk of hydrate formation (and clogging) is considerably reduced as compared to conventional solutions because the taps are held at substantially the same temperature as the flow, or the use of open taps could be eliminated by arranging sealing membranes in both ends of the cone. The need for redundancy is thus reduced.

The MW-dP-sensor may be combined with other resonator sensor(s). This results in a reduction of the amount of electronics required, because the MW-dP-sensor is measured with the same microwave electronics unit as the other(s). The MW-dP-sensor needs no separate electronics for communication. This improves the reliability (increases the MTTF).

Multiple MW-dP-sensors can be realised with one common electronics unit and switches.

A more compact design (of e.g. the Roxar WGM) is possible because no external dP-transmitters are required, yielding reduced manufacturing cost for the differential pressure measuring unit. The differential pressure electronics may be combined with the WGM-electronics as both circuits work in the microwave range.

No electrical cables are needed to connect the MW-dP-sensor to the computer. Conventional external dP-transmitters have their own power and signal cables connecting them to the computer. In subsea applications these cables have to be protected by steel pipes.

The resonant frequency of the MW-dP-sensor is determined by the physical dimensions of the resonator and the dielectric permittivity of the filling fluid only. No external structures like cables or the electronics influence the measurement. The sensor is therefore virtually free of drift. The influence of the temperature (through thermal expansion or the permittivity of the silicon oil) is well understood and easy to correct for. The temperature then needs to be measured, but e.g. in the Roxar WGM the temperature of the fluid is always measured anyway, so no extra temperature measurement is needed. The changes in the mechanical properties of the sensing membrane are then the only sources of drift.

REFERENCES

[1] U.S. Pat. No. 5,814,738 (McCrometer),
[2] U.S. Pat. No. 6,915,707, =WO03/034051, PCT/NO02/00349 (Roxar),
[3] "Introducing Low Differential Pressure Instruments", product brochure no. 5M-1-01 from Orange Research, 140 Cascade Blvd, Milford Conn. 06460, USA, (www.orangeresearch.com),
[4] U.S. Pat. No. 6,651,506
[5] Nyfors, E., P. Vainikainen, *Industrial Microwave Sensors*, Artech House 1989, Chapter 3, pages 127-149.
[6] U.S. Pat. No. 6,466,035 (=WO99/63331, PCT/NO99/00179).
[7] Nyfors, E., Ø. Lund Bø, "Compact wet gas flow meter based on microwave and differential pressure measurements", *Proc. 5th Int. Conf on Electromagnetic Wave Interaction with Water and Moist Substances, ISEMA 2003*, Rotorua, New Zealand, March 2003, pp. 146-153.

The invention claimed is:

1. A differential pressure (dP) measurement device for flow measurement comprising:
   a microwave resonator including two chambers separated by a flexible or yieldable electrically conductive member, wherein the electrically conductive member flexes or yields when subjected to a differential pressure between the two chambers and a resonant microwave frequency of the resonator is altered by the flexure or yielding of the electrically conductive member;
   each of the two chambers including an opening external to the dP measurement device, wherein the openings provide a differential pressure between the two chambers, and
   an electronic unit including at least one microwave probe coupled to said microwave resonator, said electronic unit producing an output dependent on the resonant microwave frequency of said resonator.

2. The dP-measurement device according to claim 1, wherein said microwave resonator is a microwave coaxial resonator.

3. The dP-measurement device according to claim 2, wherein said microwave coaxial resonator is connected to the microwave probed placed on a dP-generating structure of the resonator and capacitively coupled to a corresponding microwave excitation probe placed on a pipeline adjacent to said dP-generating structure.

4. The dP-measurement device according to claim 3, wherein said microwave excitation probe is positioned to excite the microwave coaxial resonator formed by the pipeline wall, the dP-generating structure and the volume between the pipeline wall and dP-generating structure.

5. The dP-measurement device according to claim 1, wherein said flexible part or said yieldable member is integrated in a Venturi-section of a pipeline.

6. The dP-measurement device according to claim 1, wherein said flexible part or said yieldable member is integrated in a wall of a pipeline conveying a fluid.

7. The dP-measurement device according to claim 1, comprising a circulator whereby the microwave probe excites a microwave signal in said microwave coaxial resonator as well as to couple a microwave signal reflected from the resonator to a microwave signal detection unit, and whereby a control and signal processing unit calculates a reflection coefficient of said resonator, said reflection coefficient representing a state of said resonator.

8. The dP-measurement device according to claim 1, wherein the microwave probe includes a first microwave probe and a second microwave probe each coupled to said resonator at separate positions on said resonator, said first microwave probe being coupled to a microwave signal generator for exciting a microwave signal into said resonator, said second microwave probe coupling a microwave signal transmitted in said resonator to a microwave signal detection unit, and where a control and signal processing unit calculates a transmission coefficient of said resonator, said transmission coefficient representing a state of the resonator.

9. The dP-measurement device according to claim 1, wherein an electronic oscillator circuit is coupled with said microwave coaxial resonator such that the oscillator locks to the resonant frequency of the resonator, whereby a measurement of the resonant frequency of the electronic oscillator circuit as a result of application of a differential pressure provides a measurement of the said microwave coaxial resonator.

10. The dP-measurement device according to claim 1, comprising a differential pressure generating structure creating a differential pressure in a fluid flowing in a pipeline conveying said fluid.

11. The dP-measurement device according to claim 1, wherein the flexible part or yieldable member divides an internal volume defining said microwave coaxial resonator into a first and second chamber, said first and second chambers each having separate openings towards a fluid flow of a pipeline conveying said fluid.

12. The dP-measurement device according to claim 11, wherein said first and second chambers are coupled as a pair of microwave coaxial resonator sensors, separated by a membrane, whereby a deformation in the membrane causes shifts in the resonant frequency for the two resonators in opposite directions.

13. dP-measurement device according to claim 11, wherein the separate openings are arranged so as to give a pressure difference between said first and second chambers when a fluid flows in the pipeline.

14. The dP-measurement device according to claim 1, comprising a microwave power dividing part arranged to split a microwave signal from a microwave generator to a wet gas meter (WGM) unit and to a differential pressure unit (dP), and a microwave power combiner is arranged for combining microwave power having been transmitted via said WGM-unit and via said dP-unit.

15. The dP-measurement device according to claim 1, comprising microwave power switching parts arranged to switch a microwave signal from a microwave generator (µW-Tx) between a wet gas meter (WGM) unit and a differential pressure unit (dP), and to switch the microwave signal having been transmitted via said WGM-unit or via said dP-unit to the microwave detection unit.

16. The dP-measurement device according to claim 1, comprising a tunable microwave signal generator, and where the frequency of said generator is controlled by a control and processing unit connected to said microwave signal generator.

17. The dP-measurement device according to claim 1, wherein a tunable microwave signal generator, and said control and processing unit is adapted to cooperate to provide a microwave signal scanning a range of frequencies, said range of frequencies including a resonant frequency of said first microwave coaxial resonator.

18. The dP-measurement device according to claim 1, comprising a second microwave resonator sensor operating as a reference resonator or a compensating element for compensating for temperature variations or static pressure changes.

19. The dP-measurement device according to claim 18, wherein said second microwave resonator sensor is a microwave coaxial resonator sensor.

20. The dP-measurement device according to claim 1, wherein an elongated centre element of said microwave coaxial resonator is short circuited at one end to an internal wall of one end of said resonator.

21. The dP-measurement device according to claim 1, wherein an elongated centre element of said microwave coaxial resonator is open circuited at both ends.

22. The dP-measurement device according to claim 1, comprising a helically shaped centre element.

23. The dP-measurement device according to claim 1, wherein said electronic unit comprises a Dielectric Resonator Oscillator coupling and couples a microwave generator via a microwave probe to said first microwave coaxial resonator having a flexible or yieldable part or member.

24. A differential pressure (dP) measurement device comprising:
a microwave resonator including a first chamber and a second chamber, and an electrically conductive member between the first chamber and the second chamber, the first chamber and the second chamber each have an opening to sense a pressure of a flowing fluid;
a first microwave probe applies microwave energy to the resonator;
a second microwave probe senses a microwave resonance of the resonator, wherein the resonance is dependent on a deformation of the electrically conductive member and the deformation of the electrically conductive member is dependent on a pressure difference between the first chamber and the second chamber, and the second microwave probe generates an output signal indicating the microwave resonance.

25. The dP measurement device of claim 24 wherein the first microwave probe and the second microwave probe are the same probe.

26. The dP measurement device of claim 24 wherein the first microwave probe is applied to a location on the resonator distinct from a location to which the second microwave probe is applied.

* * * * *